(12) United States Patent
Vanderstraeten et al.

(10) Patent No.: US 7,569,095 B2
(45) Date of Patent: Aug. 4, 2009

(54) METHOD FOR DRYING A GAS AND DEVICE APPLIED THEREBY

(75) Inventors: Bart Etienne Agnes Vanderstraeten, Haacht (BE); Ben Paul Karl Van Hove, Antwerp (BE)

(73) Assignee: Atlas Copco Airpower, naamloze vennootschap, Wilrijk (BE)

( * ) Notice: Subject to any disclaimer, the term of this patent is extended or adjusted under 35 U.S.C. 154(b) by 379 days.

(21) Appl. No.: 11/659,040

(22) PCT Filed: Jul. 28, 2005

(86) PCT No.: PCT/BE2005/000121

§ 371 (c)(1),
(2), (4) Date: Jan. 31, 2007

(87) PCT Pub. No.: WO2006/012711

PCT Pub. Date: Feb. 9, 2006

(65) Prior Publication Data

US 2009/0007783 A1    Jan. 8, 2009

(30) Foreign Application Priority Data

Aug. 4, 2004  (BE) .................................. 2004/0381

(51) Int. Cl.
*B01D 53/06*    (2006.01)
*B01D 53/26*    (2006.01)

(52) U.S. Cl. ........................... 95/107; 95/123; 96/125; 96/150; 55/DIG. 17

(58) Field of Classification Search .................. 95/107, 95/113, 117, 121–123, 148; 96/113, 125, 96/146, 150; 55/DIG. 17; 34/80, 329, 330, 34/473
See application file for complete search history.

(56) References Cited

U.S. PATENT DOCUMENTS

| 4,134,743 | A  | * | 1/1979 | Macriss et al. ................. 95/113 |
| 4,926,618 | A  |   | 5/1990 | Ratliff |
| 5,385,603 | A  |   | 1/1995 | Sienack |
| 5,667,560 | A  | * | 9/1997 | Dunne .......................... 95/113 |
| 6,527,836 | B1 | * | 3/2003 | White et al. ................... 96/113 |
| 7,326,277 | B1 | * | 2/2008 | Cohen et al. ................... 95/113 |

FOREIGN PATENT DOCUMENTS

| EP | 0 566 180 A1 | 10/1993 |
| WO | WO 01/34280 A1 | 5/2001 |

* cited by examiner

*Primary Examiner*—Frank M Lawrence
(74) *Attorney, Agent, or Firm*—Bacon & Thomas, PLLC

(57) ABSTRACT

Method for drying a gas from a compressor (1) by means of a drier (2) of the type which consists of a pressure tank (3) with a drying zone (4) and a regeneration zone (5), with a rotor (6) which is composed of a drying element (7) in which has been provided an adsorption and/or absorption medium (8) which is alternately put through the drying zone (4) and the regeneration zone (5), characterised in that at a low load or zero load, the inlet of the regeneration zone (5) is connected to the user network (12) via a regeneration pipe (27), and in that the outlet of the regeneration zone (5) is connected to the atmosphere.

10 Claims, 1 Drawing Sheet

METHOD FOR DRYING A GAS AND DEVICE APPLIED THEREBY

Figure 1:
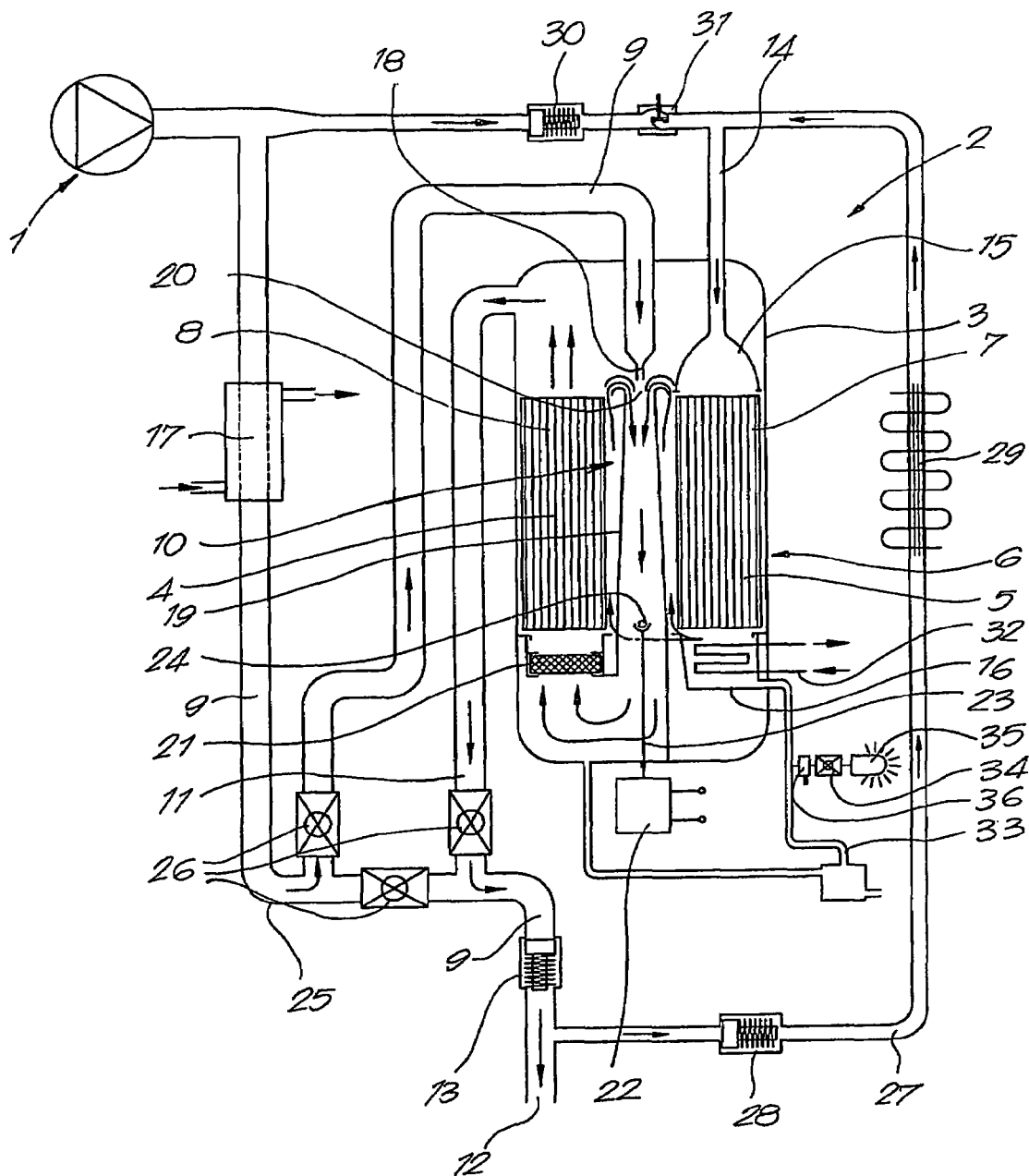

The present invention concerns a method for drying a gas, more particularly for drying a gas from a compressor.

It is known to dry the gas coming from a compressor by cooling it first and by subsequently guiding it through an adsorption and/or absorption medium.

With such a known method, it is also known to alternately put this adsorption and/or absorption medium through what is called a drying zone and what is called a regeneration zone into a drier, whereby the adsorption and/or absorption medium is regenerated in the is regeneration zone.

To this end, according to a known method, a part of the gas to be dried is used, which is guided, without cooling it first, over the adsorption and/or absorption medium in the regeneration zone, whereby it absorbs moisture.

A disadvantage of this known method is that the regeneration can only be done efficiently when the drier is loaded relatively heavily, more particularly when the compressor produces relatively much compressed gas which has to be dried by the drier.

At a low load, however, the regeneration according to the known method is inefficient, as a result of which the gas to be dried can no longer be dried to the required dew point. Hereby is observed that the dew point represents fluctuations at a low load, which are usually not desired by the user.

The present invention aims to remedy the above-mentioned and other disadvantages.

To this end, the invention concerns a method for drying a gas from a compressor, for feeding a user network, by means of a drier of the type which consists of a pressure tank which is provided with a drying zone and a regeneration zone, with a rotor composed of a drying element in which is provided an adsorption and/or absorption medium which is alternately put through the drying zone and the regeneration zone, whereby, in case of a low load or zero load, the inlet of the regeneration zone is connected to the user network via a regeneration pipe, and the outlet of the regeneration zone is connected to the atmosphere, such that a gas flow is created from the user network through the regeneration zone to the atmosphere, to thus absorb moisture and to evacuate it from the adsorption and/or absorption medium in the above-mentioned regeneration zone.

An advantage of the present invention is that the adsorption and/or absorption medium in the drier can always be sufficiently regenerated, also during a phase of unloaded operation of the compressor, such that the drier is always capable of drying the gas to be dried to the required dew point or almost the required dew point.

Another advantage is that the dew point of the dried gas remains practically constant when using the compressor under different operating conditions and, as a consequence, has few fluctuations.

The present invention also concerns a device which can be applied with the above-described method according to the invention, which device mainly consists of a drier of the type which consists of a pressure tank which is provided with a drying zone and a regeneration zone, with a rotor which is composed of a drying element in which is provided an adsorption and/or absorption medium which is alternately put through the drying zone and the regeneration zone; a main canalisation which is connected to the outlet of the compressor and which opens in a mixing device whose outlet is connected to the inlet of the drying zone; an outlet pipe which connects the outlet of the drying zone to the user network; and a secondary canalisation which connects the outlet of the compressor to the inlet of the regeneration zone, whereby this device is provided with a regeneration pipe which connects the above-mentioned user network to the above-mentioned inlet of the regeneration zone and whereby the outlet of the regeneration zone is connected to a gas drain with a valve.

In order to better explain the characteristics of the invention, the following embodiment of a device according to the invention for drying a gas is described as an example only without being limitative in any way, with reference to the sole accompanying FIGURE, which schematically represents a device according to the invention.

As is represented in the FIGURE, the device for drying a gas is connected to a compressor 1, and it mainly consists of a drier 2 of the type which is described in BE 1,005,764 and which consists of a pressure tank 3 with a drying zone 4 and a regeneration zone 5, with a rotor 6 composed of a circular drying element 7 in which is provided an adsorption and/or absorption medium 8 which is alternately put through the drying zone 4 and the regeneration zone 5.

Further, the drier 2 comprises a main canalisation 9 which connects the drier 2 to the outlet of the compressor 1 and which opens in a mixing device 10 whose outlet is connected to the inlet of the above-mentioned drying zone 4 and which, in this case, is integrated in the pressure tank 3; an outlet pipe 11 connects the outlet of the drying zone 4 to a user network 12, whereby the outlet pipe 11 and the user network 12 are separated by a non-return valve 13; and a secondary canalisation 14 which couples the outlet of the compressor 1 to the inlet of the regeneration zone 5.

This regeneration zone 5 is formed of a sector of the rotor 6 which is protected on both axial sides by means of screens 15 and 16. The rest of the rotor 6 forms the drying zone 3.

The above-mentioned main canalisation 9 is preferably provided with a cooler 17.

The mixing device 10 in this case consists of an ejector which, as is known, contains a jet pipe 18 and a mixing pipe 19, in between which is provided a suction opening 20. The mixing pipe 19 opens at the inlet of the drying zone 4, whereby a liquid separator 21 can be provided if necessary between the mixing device 10 and the drying zone 4.

In the above-described type of drier 2, the mixing device 10 preferably extends axially through the rotor 6 and, if necessary, it can be used as the driving shaft for the rotor 6, to which end the mixing pipe 19 is connected to a motor 22 by means of a shaft 23 which is connected to the mixing pipe 19 by means of a coupling 24.

The above-mentioned outlet pipe 11 of the drier 2 can, as usual, be connected to the main canalisation 9, by means of a bypass 25 which, in that case, just as the main canalisation 9 and the outlet pipe 11, contains a valve 26.

According to the invention, a regeneration pipe 27 connects the above-mentioned user network 12 to the above-mentioned secondary canalisation 14, whereby this regeneration pipe 27 is provided with a non-return valve 28 and a heater 29, whereas in the secondary canalisation 14, upstream in relation to the connecting point with the regeneration pipe 27, are provided a non-return valve 30 and a control valve 31.

At the outlet of the regeneration zone 5 in the drier 2 is provided a cooler 32, and at the bottom of the above-mentioned screen 16 which confines the regeneration zone 5 is provided a drain 33 which comprises a valve 34, a sound absorber 35 and a gas drain 36.

The working of the above-described device according to the invention is simple and as follows.

When the drier 2 is normally loaded, more particularly when the compressor 1 is operational and produces compressed gas, this gas is guided through the main canalisation 9, along the cooler 17 into the drier 1, where the gas to be dried is carried through the mixing device 10 and is then dried by means of the above-mentioned moisture separator 21 and the adsorption and/or absorption medium 8 which absorbs moisture from the gas.

The dried gas is subsequently guided through the outlet pipe 11 to the user network.

In order to be able to regenerate the adsorption and/or absorption medium 8, the rotor 6 is driven at low speed by the motor 22, whereby the adsorption and/or absorption medium 8 is alternately put through the drying zone 4 and the regeneration zone 5.

The secondary canalisation 14 guides a part of the gas to be dried, fed by means of the secondary canalisation 10, from the outlet of the compressor 1 to the regeneration zone 5, which part of the gas does not flow through the main canalisation 9 and, as a consequence, is not cooled in the cooler 17.

Consequently, the gas to be dried is still relatively warm and unsaturated, as a result of which it can absorb moisture from the adsorption and/or 10 absorption medium 8 while flowing through the regeneration zone 5.

At the outlet of the regeneration zone 5, this gas is first cooled by the cooler 32, before being sucked in the mixing pipe 19 through the suction openings 20, where this gas is mixed with gas to be dried from the main canalisation 9.

Gas to be dried is prevented from flowing through the regeneration pipe 27 of the secondary canalisation 14 to the user network 12 thanks to the above-mentioned non-return valve 28.

In the case of a zero load of the drier 2, when the compressor 1 is not operational or works unloaded, there is no gas output at the outlet of the compressor 1.

When the compressor 1 alternately works fully loaded and unloaded or not at all, the gas output at the outlet of the compressor 1 may be insufficient for an efficient regeneration of the absorption medium 8, such that fluctuations may arise in the atmospheric humidity of the dried gas which is fed to the user network 12.

This is particularly the case when a user requires a relatively small output of compressed air, whereby the compressor 1 works unloaded for a relatively long time or is disconnected.

A method according to the invention offers a solution to this disadvantage by opening the above-mentioned valve 34 when the compressor 1 is working unloaded or is not working at all, and by preferably stopping the rotor 6.

The above-mentioned opening of the valve 34 has for a result that the pressure in the drier 2 drops, as the compressed gas in the drier 2 can escape to the environment via the gas drain 36.

As a result of this pressure drop in the drier 2, and consequently also in the regeneration pipe 27, the non-return valve 28 will open, as a result of which compressed gas flows from the user network 12 to the above-mentioned regeneration pipe 27.

This gas is then heated in the heater 29 to a temperature of for example 180° C., and it is guided through the regeneration zone 5 to the valve 34, whereby the gas absorbs moisture from the regeneration zone 5.

Once the adsorption and/or absorption medium 8 has been entirely regenerated, or after a certain time to be set, the valve 34 is closed.

Also when the compressor 1 is driven at full load again so as to feed the user network 12, and a sufficient gas output is available again for a normal working of the regeneration zone, the valve 34 will be closed, and the rotor 6 will be driven again.

Of course, it is not necessary to equip the regeneration pipe 27 with a heater 29, but the latter makes it possible to use a minimum amount of dried gas for the above-described regeneration.

It should hereby be noted that, at least at a low load of the drier 2, said heater 29 preferably stays operational all the time, in order to avoid that it has to be warmed up again regularly.

Also, at a zero load of the compressor 1 or when it is not working, the above-described method for regenerating a part of the adsorption and/or absorption medium 8 can be applied several times in a row, whereby between each regeneration, the rotor 6 is turned, for example at an angle which corresponds to the size of the sector of the rotor 6 which is used as a regeneration zone 5.

It should be noted that, in order to allow for a user-friendly control of the compressor 1 and the drier 2, the valve 34 of the gas drain 36 and if necessary the motor 22 can be controlled on the basis of the load of the compressor 1, whereby, as soon as the compressor 1 is not working at all or is working unloaded for a certain percentage of the time, or more particularly at a load of the drier which is lower than a pre-set value, the valve 34 is opened and the motor 22 is stopped or uncoupled from the rotor 6.

Naturally, this control can also take place on the basis of the output at the outlet of the compressor 1.

The above-described invention is by no means limited to the above-described embodiments represented in the accompanying drawing; on the contrary, it can be realised according to different variants while still remaining within the scope of the invention.

The invention claimed is:

1. Method for drying a gas from a compressor (1), for feeding a user network (12) by means of a drier (2) of the type which comprises pressure tank (3) which is provided with a drying zone (4) and a regeneration zone (5), and a rotor (6) which comprises a drying element (7) in which is provided an adsorption and/or absorption medium (8) which is alternately put through the drying zone (4) and the regeneration zone (5), comprising the steps: at a low load or zero load, the inlet of the regeneration zone (5) is connected to the user network (12) via a regeneration pipe (27), and the outlet of the regeneration zone (5) is connected to the atmosphere, in such a manner that a gas flow is created from the user network (12) through the regeneration zone (5) to the atmosphere, to thus absorb moisture and to evacuate it from the adsorption and/or absorption medium (8) in the regeneration zone (5).

2. Method according to claim 1, wherein the gas is heated in the regeneration pipe (27) before being guided through the regeneration zone (5).

3. Method according to claim 2, wherein the gas is heated to a temperature on the order of magnitude of 1800° C.

4. Method according to claim 1, wherein the rotor (6) which alternately puts the adsorption and/or absorption medium (8) through the drying zone (4) and the regeneration zone (5) of the drier (1) is stopped during the regeneration.

5. Gas drying arrangement drying a gas from a compressor (1) for a user network (12), comprising drier (2) including a pressure tank (3) having a drying zone (4) and a regeneration zone (5), and a rotor (6) which comprises a drying element (7) in which has been provided one or both of an adsorption and absorption medium (8) which is alternately put through the drying zone (4) and the regeneration zone (5); a main canalisation (9) which is arranged to guide the gas to be dried through the drying zone (4) via a mixing device (10) onto which the outlet of the regeneration zone (5) is connected; an outlet pipe (11) which connects the outlet of the drying zone (4) to the user network (12); a secondary canalisation (14) which connects the outlet of the compressor (1) to the inlet of the regeneration zone (5); and a regeneration pipe (27) which connects the user network (12) to the inlet of the regeneration zone (5), and the outlet of the regeneration zone (5) is connected to a gas vent (36) with a valve (34).

6. Gas drying arrangement according to claim 5, wherein regeneration pipe (27) is provided with a heater (29).

7. Gas drying arrangement according to claim 5, wherein the outlet pipe (11) and the regeneration pipe (27) are provided with a non-return valve (13, 28).

8. Gas drying arrangement according to claim 5, wherein the gas vent (36) is provided with a sound absorber (35).

9. Gas drying arrangement according to claim 5, wherein in the secondary canalisation (14) is provided a non-return valve (30) disposed upstream relative to the connection between the secondary canalisation (14) and the regeneration pipe (27).

10. Gas drying arrangement according to claim 5, wherein the valve (34) of the gas vent (36) is actuated when the load of the drier (2) is lower than a preset value.

* * * * *